Jan. 26, 1971  J. L. CLARK  3,558,397
METHOD OF MAKING A TUBE-TO-BAG CONNECTION
Filed Feb. 15, 1968  2 Sheets-Sheet 1

Inventor
James L. Clark
By Paul R. Puerner
Attorney

Jan. 26, 1971  J. L. CLARK  3,558,397
METHOD OF MAKING A TUBE-TO-BAG CONNECTION
Filed Feb. 15, 1968  2 Sheets-Sheet 2
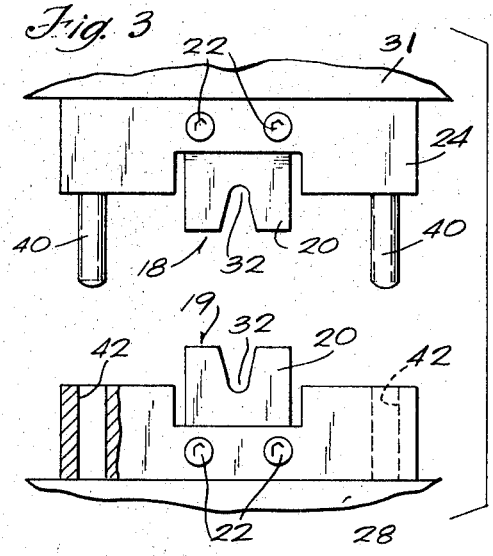
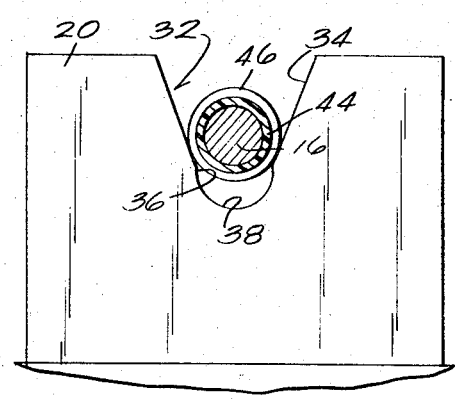
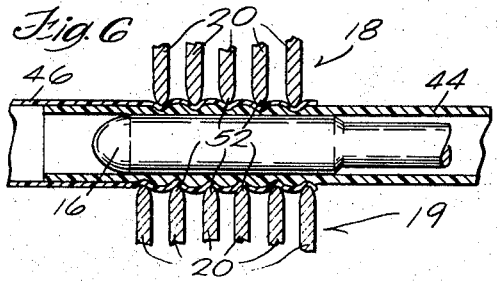
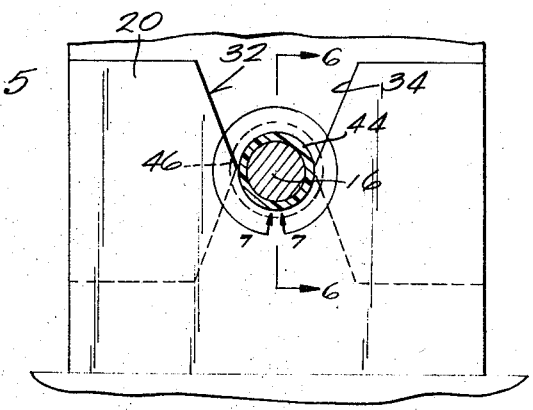
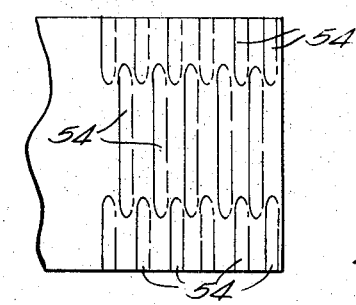
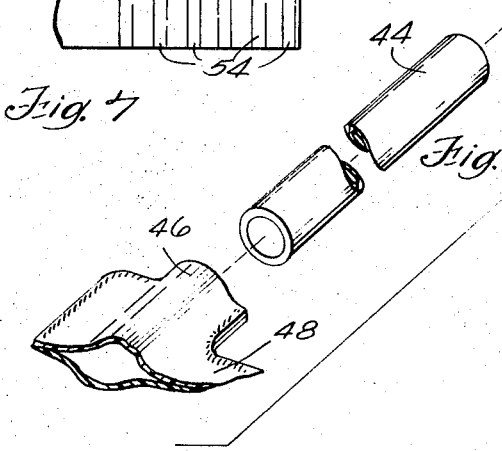
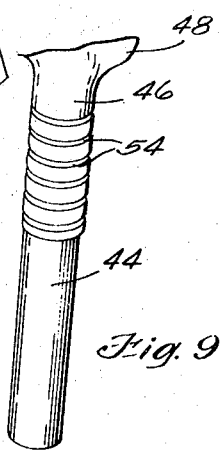
Inventor
James L. Clark
By Paul R. Puerner
Attorney United States Patent Office 3,558,397
Patented Jan. 26, 1971

3,558,397
METHOD OF MAKING A TUBE-TO-BAG CONNECTION
James L. Clark, Whitefish Bay, Wis., assignor to Plastronics, Inc., Milwaukee, Wis., a corporation of Wisconsin
Filed Feb. 15, 1968, Ser. No. 705,802
Int. Cl. B29c 17/00
U.S. Cl. 156—272  4 Claims

ABSTRACT OF THE DISCLOSURE

A tube-to-bag connection comprising a plastic container having a nipple portion into which a plastic tube is inserted. A probe type welding electrode is then inserted into the end of the tube to a position wherein the tip portion of the probe is located within the nipple portion of the plastic container. A pair of outer electrodes or jaw assemblies are positioned around the exterior of the nipple portion. Such jaw assemblies are comprised of a plurality of plate members having aligned notches therein. The plates of the respective jaw assemblies when closed become interleaved one with the other with the edges of the notches in line contact with the exterior surface of the nipple. The welding step is performed by introducing a high frequency welding current between the central probe electrode and the outer jaws.

BACKGROUND OF THE INVENTION

(I) Field of invention

This invention relates to an improved tube-to-bag connection and the method of making such connection.

(II) Description of the prior art

The most pertinent prior art known to applicant is U.S. Pat. No. 3,322,590. As compared with such patent, the present invention produces a better seal at the connection by a method wherein none of the apparatus employed for making the connection need be positioned inside the plastic container. While some other prior art methods do not employ a probe inside the bag, none of such prior methods provide a tighter, more reliable seal than does the present invention.

SUMMARY OF THE INVENTION

The first step in the performance of the method is insertion of a tube in the nipple portion of a plastic bag and the positioning of a probe electrode inside the tube in a position wherein it will lie inside the nipple. The next step is to clamp the nipple between a pair of electrode jaw assemblies each of which is comprised of a plurality of spaced plate members having aligned notches therein. The nipple extends through the opening formed by the notches in the plates and is held firmly therebetween under slight pressure. The final step is the passing of an electronic welding current between the probe electrode and the jaw assembly electrodes to thereby weld the tube to the nipple portion of the bag.

BRIEF DESCRIPTION OF THE DRAWINGS

In the drawings:
FIG. 3 is a fragmentary front elevation view of the apparatus shown in FIG. 1, but with the parts of the tube-to-bag connection removed;
FIG. 4 is a fragmentary sectional view taken through a lower jaw assembly before the upper jaw assembly is moved into welding position;
FIG. 5 is a view similar to FIG. 4, but with the two jaws of the welding apparatus in closed position and after the welding step has been performed;
FIG. 6 is a sectional view taken along line 6—6 of FIG. 5;
FIG. 7 is a developed view of the external surface of a completed tube-to-bag connection taken along line 7—7 of FIG. 5;
FIG. 8 is an exploded perspective view showing the parts of the tube-to-bag connection before the welding step,
and
FIG. 9 is a perspective view of the tube-to-bag connection after the welding step has been completed.

Referring now to the drawings in detail, FIG. 2 shows one form of the apparatus which can be employed in the method of this invention which apparatus includes a probe-type welding electrode 10 having a handle 12, a pair of locating shoulders 14, 14 and a welding tip portion 16.

Figure 2:
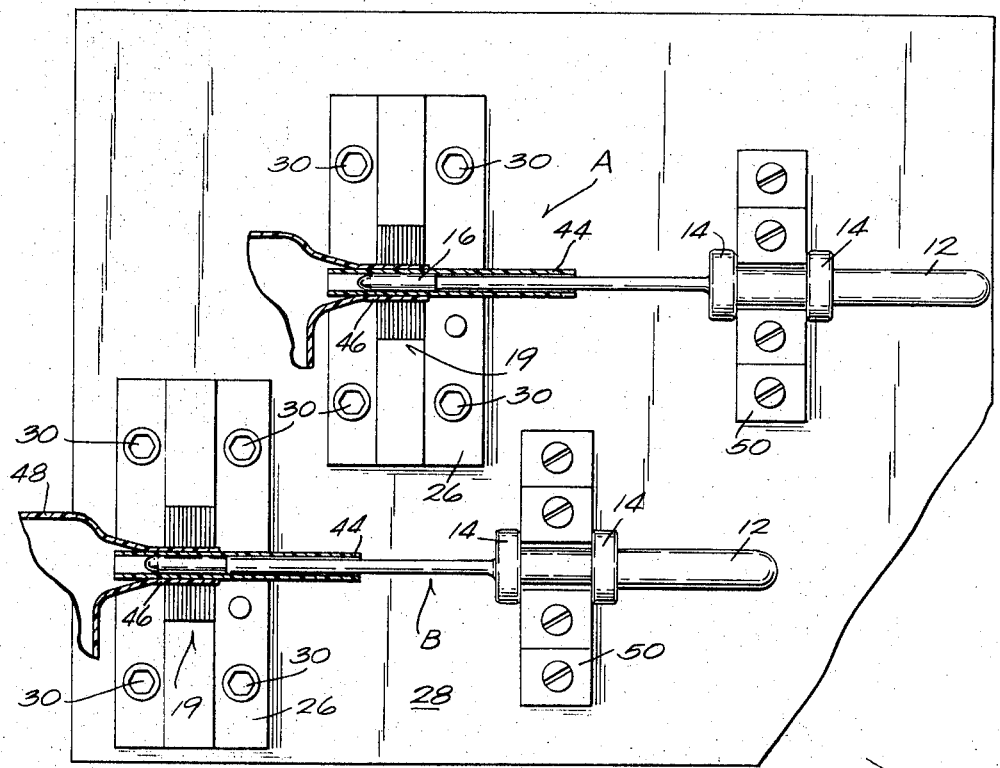
FIG. 2 is a horizontal sectional view taken along line 2—2 of FIG. 1.

The welding apparatus also includes a pair of electrodes or welding jaw assemblies 18 and 19 each of which is comprised of a plurality of plate members 20. The plate members 20 of each assembly are of identical configuration and are rigidly secured together in an aligned face-to-face relationship by any suitable means such as pairs of bolts 22, 22 as shown in FIG. 3. Upper and lower jaw assemblies 18 and 19 are mounted in upper and lower mounting blocks 24 and 26, respectively. Lower mounting block 26 is secured to a bed plate 28 by bolts 30 as shown in FIG. 2 and upper mounting block 24 is secured to a reciprocating support plate 31 by any suitable fastening means (not shown).

At this point it should be noted that in the preferred embodiment of the welding apparatus as shown in the drawings (FIGS. 1 and 2) two separate sets A and B of welding jaw assemblies and associated equipment are provided. Since each set is of identical construction and operation only one set will be described herein.

As stated previously, plate members 20 are of identical construction each having a notch 32 therein which, as shown in FIG. 4, is comprised of an inwardly tapering portion 34, a very short vertical portion 36 (having parallel sides) and a semicircular root portion 38.

As best shown in FIG. 6, the plates 20 of upper and lower jaw assemblies 18 and 19 are equally spaced from each other with the distance between adjacent plates being substantially equal to the thickness of the plates. In the preferred embodiment the plates have a thickness of .056″+.000−.001 and are spaced .058″+.001−.000 from each other. Also, as shown in FIG. 6, upper and lower jaws 18 and 19 are mounted on their respective support plates 31 and 28 so that the plates of one jaw assembly will lie directly opposite the spaces between the plates of the other jaw assembly. This means, of course, that when the jaw assemblies are moved into engagement with each other, the plates of each assembly will become interleaved one with the other. As shown in FIG. 3, such movement is limited by pin members 40, 40 which move in and out of holes 42 in mounting block 26 and thus also serve to guide the relative movement of the jaw assemblies.

The steps of the method are as follows. The first step (FIGS. 1 and 2) is to insert a tube 44 through the nipple portion 46 of a plastic container or bag 48 only a portion of which is shown in the drawings. This is most easily accomplished by inserting tube 44 through the top opening of the bag and then threading it through nipple 46 to the position shown in FIG. 2. While the material of tube 44 and nipple 46 can vary to some extent, it is preferable that they are both made of polyvinyl chloride plastic.

The second step is to insert the electrode 10 into the tube 44 with the tip portion 16 positioned inside nipple 46 of bag 48 as shown in FIG. 2. The parts are then placed on the welding apparatus with tip 16 of electrode 10 positioned in the plate notches 32 of the lower jaw assembly 19. Such positioning is facilitated by shoulders 14, 14 on electrode 10 which are adapted to register with a locating block 50 mounted on bed plate 28 as clearly shown in FIG. 2. As shown in FIG. 4, when the parts are simply placed in notches 32 of plates 20 they will not lie in the root portions 38, it being necessary to force the parts into the root portions by the application of slight pressure.

Figure 1:
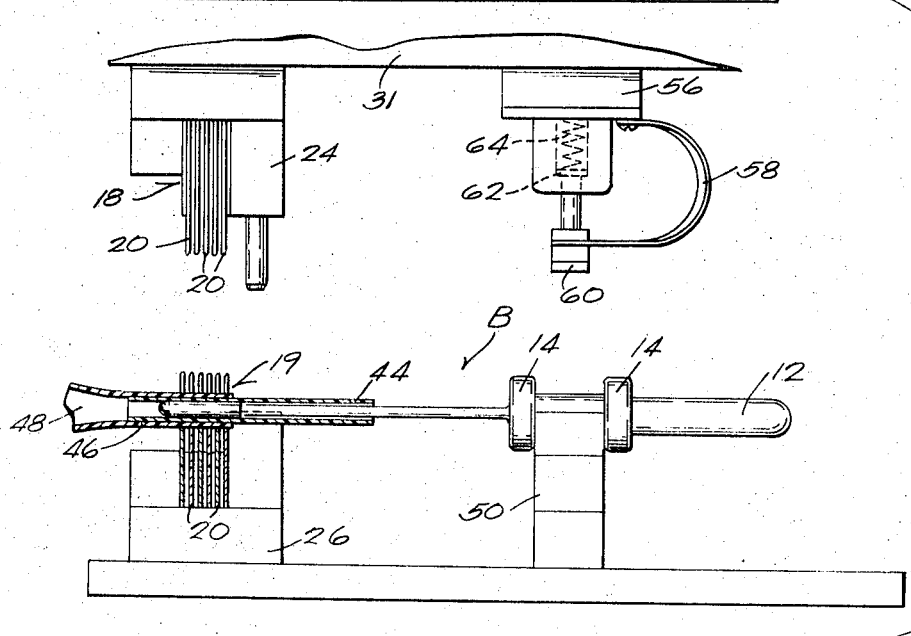
FIG. 1 is a side elevation view of the apparatus used in making a tube-to-bag connection showing the parts of such connection in position for the welding operation.

The next step is to lower upper jaw assembly 18 from the position shown in FIGS. 1 and 3 to that shown in FIGS. 5 and 6. This is accomplished by any suitable means such as a hydraulic power cylinder (not shown). With the parts in the FIG. 5 position, the plates 20 of one jaw assembly will be positioned between the plates of the other assembly with the portions 38 of notches 32 in such plates providing a circular opening therethrough in which the nipple 46, tube 44 and probe tip 16 are snugly held. As shown in FIG. 6, the edges of plates 20 which form the circular opening referred to above are tapered to a rounded edge 52. Also, as shown in FIG. 6, the parts are dimensioned so that the edges 52 of plates 20 will contact the outer surface of nipple 46 and deform the plastic material slightly at the lines of contact. It will be appreciated at this point that the edge 52 of any one plate will make contact with nipple 46 for only a 180-degree portion of the nipple's outer surface.

With the parts positioned under slight pressure between jaw assemblies 18 and 19, the welding step is performed by introducing a high frequency welding current to the parts by any suitable source of electrical energy (not shown). The source of energy may be supplied from either the probe or the jaws whichever is most convenient. The amount of energy necessary will vary with the size and type of materials used and can be determined by the application of prescribed calculations and experiments well known in the art.

The high frequency welding current is fed to probe 10 by the spring-mounted plunger 60 shown in FIG. 1. When the upper support plate or platen 31 is lowered into welding position, plunger 60 will make snug contact with probe 10 by the action of spring 64 mounted between terminal 56 and the end 62 of the plunger. With the parts thus positioned, high frequency current is fed into probe 10 from terminal 56 through flexible arm 58 and plunger 60. The current will then pass to the tip 16 of the probe, through the plastic parts to be welded and then out through the plates 20 of jaw assemblies 18 and 19.

The welding step described above will cause the material of nipple 46 to be fused to the tube 44 at the lines of contact between the edges 52 of plates 20 and the nipple 46. FIG. 7 is a developed view of the external surface of a completed tube-to-bag connection. The welded areas are clearly shown in FIG. 7 and are indicated thereon by reference numeral 54. As shown, the adjacent welded areas 54 extend for slightly more than 180 degrees of the nipple's circumference and thus overlap each other slightly.

The foregoing method and apparatus not only provide an effective seal between the parts but in addition provide welded areas of uniform configuration involving a minimum of deformation of the material at the welds. Furthermore, as shown in FIG. 9, the welding connection provides a neat and uniform external appearance.

Although but one embodiment of the present invention has been illustrated and described, it will be apparent to those skilled in the art that various changes and modifications may be made therein without departing from the spirit of the invention or from the scope of the appended claims. For example, while the connection shown and described involves a nipple and a tube, this invention could be employed equally as well to connect a pair of tubes together.

I claim:

1. The method of making a sealed connection between a plastic tube and a plastic bag having a nipple formed therein comprising the steps of:
    inserting a tube in the nipple of the bag and a probe electrode inside the tube in a position wherein it will lie inside the nipple;
    clamping the nipple between a pair of jaw assemblies each of which is comprised of a plurality of spaced plate members having aligned notches therein, said nipple extending through an opening formed by the notches in the plates; and
    passing an electronic welding current between said probe and said plates to weld the tube to the nipple portion of the bag.

2. The method of making a sealed connection between a plastic tube and a plastic bag having a nipple formed therein comprising the steps of:
    inserting a tube in the nipple of the bag and a probe electrode inside the tube in a position wherein it will lie inside the nipple;
    positioning the nipple between a pair of jaw assemblies each of which is comprised of a plurality of spaced plate members with the plate members of one assembly offset with respect to the plate members of the other assembly, the edges of each plate member adapted to contact the exterior of the nipple along a circumferential line which extends for at least 180 degrees; and
    passing an electronic welding current between said probe and said plates to weld the tube to the nipple portion of the bag.

3. The method of making a sealed connection between a plastic tube and a plastic bag having a nipple formed therein comprising the steps of:
    inserting a tube in the nipple of the bag and a probe electrode inside the tube in a position wherein it will lie inside the nipple;
    postioning the nipple between a pair of jaw assemblies; and
    applying an electronic welding current to the nipple and tube along spaced circumferential lines which extend for at least 180 degrees, each of said spaced circumferential lines being offset 180 degrees from the next adjacent circumferential line so that the weld made by any two adjacent circumferential lines will together completely encircle the nipple and tube.

4. The method of making a sealed connection between a plastic tube and a plastic bag according to claim 3 in which:
    said spaced circumferential lines extend slightly more than 180 degrees so that there will be an overlap between adjacent welds.

References Cited

UNITED STATES PATENTS 3,322,590   5/1967   Clark _____ 156—273

BENJAMIN R. PADGETT, Primary Examiner

S. J. LECHERT, Jr., Assistant Examiner

U.S. Cl. X.R.

156—219, 222, 273, 290, 293, 94, 303.1, 306